(12) United States Patent
Lee

(10) Patent No.: US 7,501,200 B2
(45) Date of Patent: Mar. 10, 2009

(54) ELECTRODE ASSEMBLY FOR LITHIUM ION CELL AND LITHIUM ION CELL USING THE SAME

(75) Inventor: Hyung-Bok Lee, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 428 days.

(21) Appl. No.: 10/438,911

(22) Filed: May 16, 2003

(65) Prior Publication Data
US 2004/0009391 A1 Jan. 15, 2004

(30) Foreign Application Priority Data
Jul. 13, 2002 (KR) ................ 2002-40974

(51) Int. Cl.
H01M 2/16 (2006.01)
H01M 2/18 (2006.01)
H01M 4/02 (2006.01)

(52) U.S. Cl. ............ 429/137; 429/133; 429/136; 429/211

(58) Field of Classification Search ............ None
See application file for complete search history.

(56) References Cited

U.S. PATENT DOCUMENTS

| | | | | |
|---|---|---|---|---|
| 5,470,674 A | * | 11/1995 | Doddapaneni et al. | 429/50 |
| 5,498,490 A | * | 3/1996 | Brodd | 429/149 |
| 6,287,719 B1 | * | 9/2001 | Bailey | 429/94 |
| 6,426,165 B1 | * | 7/2002 | Coustier et al. | 429/316 |

FOREIGN PATENT DOCUMENTS

| | | |
|---|---|---|
| CN | CH 1357937 | 7/2002 |
| KR | 10-2000-0075254 | 12/2000 |

OTHER PUBLICATIONS

Chinese Office Action of the Chinese Patent Application No. 03178714.2, issued on Apr. 21, 2006.

* cited by examiner

*Primary Examiner*—Patrick Ryan
*Assistant Examiner*—Julian Mercado
(74) *Attorney, Agent, or Firm*—Robert E. Bushnell, Esq.

(57) ABSTRACT

Provided are an electrode assembly with improved active material coatings of electrodes, by which an increase in thickness or distortion in shape can be prevented even after repeated charge and discharge cycling, and a lithium ion cell having the electrode assembly. The electrode assembly includes a negative electrode formed by winding a stacked structure having a negative electrode starting portion made of a current collector from which the negative electrode tab extends at an upper end of the negative electrode, and a negative electrode coated portion extending from the negative electrode starting portion and having a negative electrode active material coated on at least one plane of the current collector, a positive electrode formed by winding a stacked structure having a positive electrode starting portion made of a current collector from which a positive electrode tab, spaced a predetermined distance apart from a negative electrode tab, extends at an upper end of the positive electrode, and a positive electrode coated portion extending from the positive electrode starting portion and having a positive electrode active material coated on at least one plane of the current collector, the positive electrode coated portion being spaced a predetermined distance apart from the negative electrode, and a separator interposed between the positive and negative electrodes and providing electrical insulation.

18 Claims, 6 Drawing Sheets

ELECTRODE ASSEMBLY FOR LITHIUM ION CELL AND LITHIUM ION CELL USING THE SAME

CLAIM OF PRIORITY

This application claims priority to an application entitled "POLE PLATE ASSEMBLY FOR LITHIUM ION CELL AND LITHIUM ION CELL USING THE SAME", filed in the Korean Intellectual Property Office on Jul. 13, 2002, and assigned Ser. No. 2002-40974, the contents of which are hereby incorporated by reference.

BACKGROUND OF THE INVENTION

1. Technical Field

The present invention relates to an electrode assembly for a lithium ion cell, and relates to a lithium ion cell using the electrode assembly.

2. Related Art

In recent years, with the development of lightweight, wireless electronic equipment, such as mobile phones, camcorders or notebook type computers, lithium secondary batteries having a high energy density have been the focus of intense development as a power source. Particularly, among such lithium secondary batteries, lithium ion cells having a pouch casing have been actively investigated since they have a high energy density per unit weight and volume compared to other can-type or rectangular lithium ion cells.

In a lithium ion cell employing an electrode assembly allowing no extra space in thickness, when the cell swells or there is swelling deviation after repeated charge and discharge cycling, the cell may be distorted, resulting in degradation in cell performance. Also, lithium precipitation at edges of coated portions after repeated charge and discharge cycling may increase the thickness of the cell or may distort the cell.

Accordingly, it is my observation that improvements can be contemplated in the areas of electrode assemblies and lithium ion cells.

SUMMARY OF THE INVENTION

The present invention provides an electrode assembly with improved active material coatings of electrodes, by which an increase in thickness or distortion in shape, of a cell, can be prevented after repeated charge and discharge cycling, and a lithium ion cell employing the same. An electrode assembly can also be described as a pole plate assembly. An electrode can also be described as a pole or as a pole plate.

The present invention provides an electrode assembly including a negative electrode formed by winding a stacked structure having a negative electrode starting portion made of a current collector from which the negative electrode tab extends at an upper end of the negative electrode, and a negative electrode coated portion extending from the negative electrode starting portion and having a negative electrode active material coated on at least one plane of the current collector, a positive electrode formed by winding a stacked structure having a positive electrode starting portion made of a current collector from which a positive electrode tab, spaced a predetermined distance apart from a negative electrode tab, extends at an upper end of the positive electrode, and a positive electrode coated portion extending from the positive electrode starting portion and having a positive electrode active material coated on at least one plane of the current collector, the positive electrode coated portion being spaced a predetermined distance apart from the negative electrode, and a separator interposed between the positive and negative electrodes and providing electrical insulation.

The negative electrode coated portion may start at a portion where it does not overlap with the positive electrode tab or the negative electrode tab or both. Also, the positive electrode coated portion may terminate at a portion where it does not overlap with the positive electrode tab or the negative electrode tab or both. The negative electrode coated portion may terminate at a portion where it does not overlap with the positive electrode tab or the negative electrode tab or both.

The present invention provides a lithium ion cell including an electrode assembly comprising a negative electrode formed by winding a stacked structure having a negative electrode starting portion made of a current collector from which the negative electrode tab extends at an upper end of the negative electrode, and a negative electrode coated portion extending from the negative electrode starting portion and having a negative electrode active material coated on at least one plane of the current collector, a positive electrode formed by winding a stacked structure having a positive electrode starting portion made of a current collector from which a positive electrode tab, spaced a predetermined distance apart from a negative electrode tab, extends at an upper end of the positive electrode, and a positive electrode coated portion extending from the positive electrode starting portion and having a positive electrode active material coated on at least one plane of the current collector, the positive electrode coated portion being spaced a predetermined distance apart from the negative electrode, and a separator interposed between the positive and negative electrodes and providing electrical insulation, a case for encasing the electrode assembly, and an electrolytic solution impregnated into the case.

The case may be a pouch. Also, the case may be a cap plate assembly which seals the can for encasing the electrode assembly and the upper portion of the can and provides electrical connection between the electrode assembly and the outside of the electrode assembly.

In accordance with the principles of the present invention, as embodied and broadly described, the present invention provides an electrode assembly, comprising: a negative electrode formed by winding a first stacked structure, the first stacked structure including a negative electrode starting portion, a negative electrode coated portion, and negative electrode active material, the negative electrode starting portion and the negative electrode coated portion including a first current collector, the negative electrode starting portion having a negative electrode tab extending from the negative electrode starting portion, the negative electrode coated portion starting from and extending from the negative electrode starting portion, the first current collector included in the negative electrode starting portion being not coated with the negative electrode active material, with at least one plane of the first current collector included in the negative electrode coated portion being coated with the negative electrode active material; a positive electrode formed by winding a second stacked structure, the second stacked structure including a positive electrode starting portion, a positive electrode coated portion, and positive electrode active material, the positive electrode starting portion and the positive electrode coated portion including a second current collector, the positive electrode starting portion having a positive electrode tab extending from the positive electrode starting portion, the positive electrode coated portion starting from and extending from the positive electrode starting portion, the second current collector included in the positive electrode starting portion being not coated with the positive electrode active material, with at least one plane of the second current collector included in the positive electrode coated portion being coated with the positive electrode active material, the positive electrode tab being spaced a predetermined distance apart from the negative electrode tab; and a separator being disposed between said positive and negative electrodes and providing electrical insulation.

In accordance with the principles of the present invention, as embodied and broadly described, the present invention provides a lithium ion cell, comprising: an electrode assembly, comprising: a negative electrode formed by winding a first stacked structure, the first stacked structure including a negative electrode starting portion, a negative electrode coated portion, and negative electrode active material, the negative electrode starting portion and the negative electrode coated portion including a first current collector, the negative electrode starting portion having a negative electrode tab extending from the negative electrode starting portion, the negative electrode coated portion starting from and extending from the negative electrode starting portion, the first current collector included in the negative electrode starting portion being not coated with the negative electrode active material, with at least one plane of the first current collector included in the negative electrode coated portion being coated with the negative electrode active material; a positive electrode formed by winding a second stacked structure, the second stacked structure including a positive electrode starting portion, a positive electrode coated portion, and positive electrode active material, the positive electrode starting portion and the positive electrode coated portion including a second current collector, the positive electrode starting portion having a positive electrode tab extending from the positive electrode starting portion, the positive electrode coated portion starting from and extending from the positive electrode starting portion, the second current collector included in the positive electrode starting portion being not coated with the positive electrode active material, with at least one plane of the second current collector included in the positive electrode coated portion being coated with the positive electrode active material, the positive electrode tab being spaced a predetermined distance apart from the negative electrode tab; and a separator being disposed between said positive and negative electrodes and providing electrical insulation; a case encasing said electrode assembly; and an electrolytic solution being in said case.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1A:
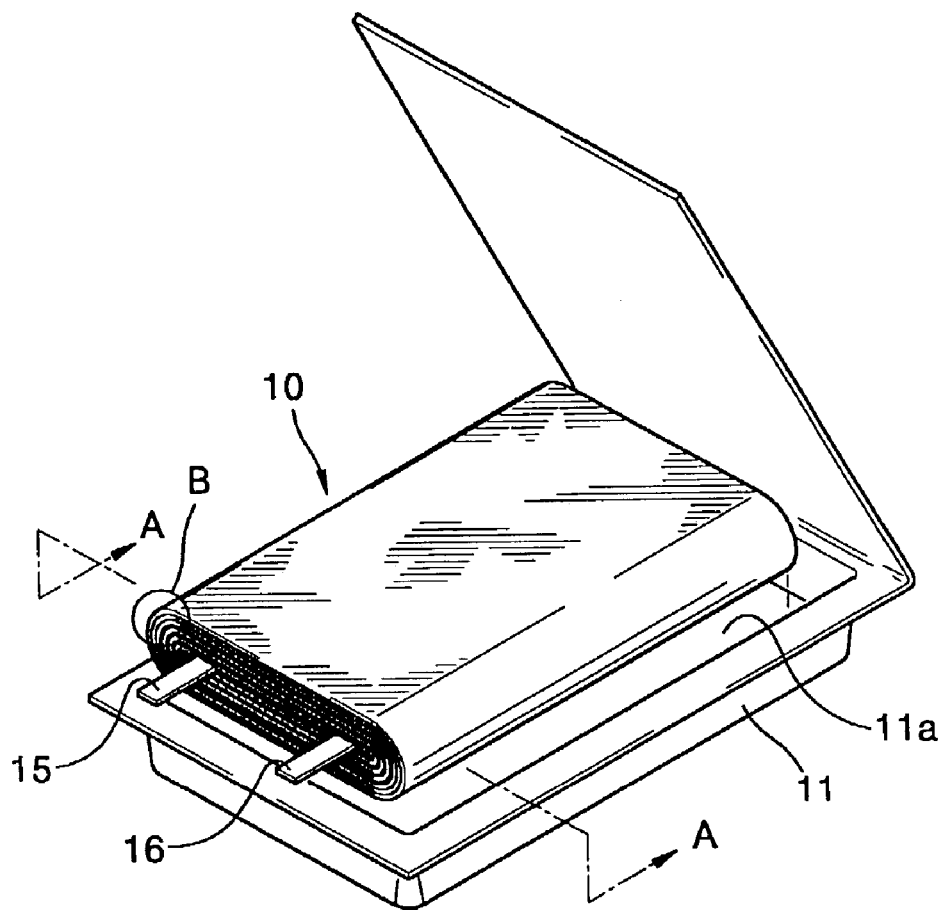
FIG. 1A is a perspective view of a lithium ion cell.
Figure 1B:
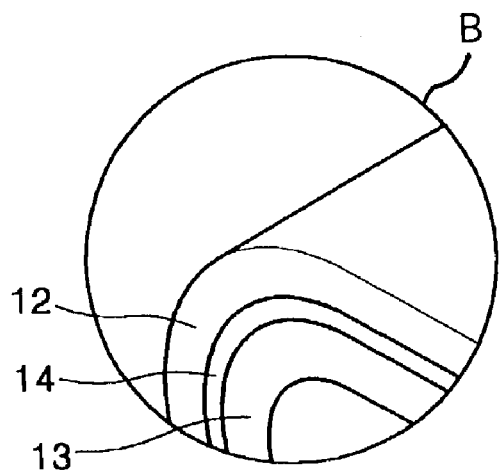
FIG. 1B is an enlarged view of a portion B shown in FIG. 1A.

FIG. 1A is a perspective view of a lithium ion cell. FIG. 1B is an enlarged view of a portion B shown in FIG. 1A.

With reference to FIGS. 1A and 1B, an electrode assembly 10 is encased in an internal space 11a of a pouch 11. The electrode assembly 10 includes a positive electrode 12 provided by coating a positive electrode active material on a surface of a positive electrode current collector, a negative electrode 13 provided by coating a negative electrode active material on a surface of a negative electrode current collector, and a separator 14 interposed between the positive and negative electrodes 12 and 13. That is to say, the positive electrode 12, the separator 14 and the negative electrode 13 are stacked and rolled up to form a jelly-roll type electrode assembly. A positive electrode tab 15 and a negative electrode tab 16 drawn from the positive electrode 12 and the negative electrode 13 form positive and negative electrode terminals, respectively. A tape (not shown) may be wrapped around each predetermined portion of the positive and negative electrode tabs 15 and 16 for insulation. An electrolytic solution is injected into the internal space 11a of the pouch 11.

Figure 2:
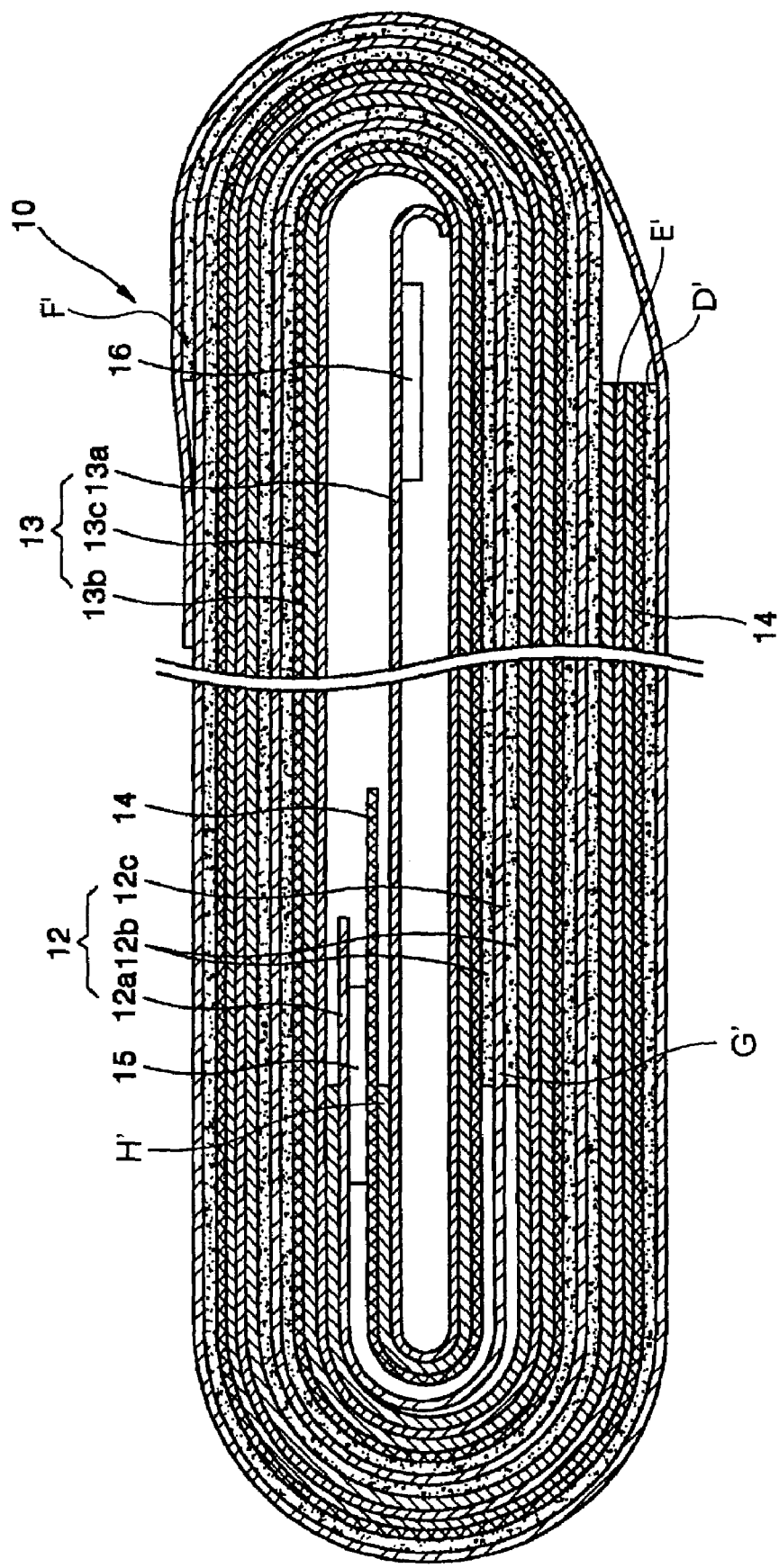
FIG. 2 is a cross-sectional view of the electrode assembly shown in FIG. 1, taken along the line A-A.

FIG. 2 is a cross-sectional view of the electrode assembly shown in FIG. 1, taken along the line A-A. With reference to FIG. 2, the electrode assembly 10 is constructed by stacking the positive electrode 12, the separator 14 and the negative electrode 13 and winding the resultant structure. In detail, the negative electrode 13 includes a negative electrode starting portion 13a made of a current collector uncoated with a negative electrode active material and having a negative electrode tab 16 connected to an upper end thereof.

Also, the negative electrode 13 includes a negative electrode coated portion 13c made of a current collector extending from the negative electrode starting portion 13a and having at least one plane coated with a negative electrode active material 13b. Since the negative electrode coated portion 13c starts at a portion overlapping with the positive electrode tab 15, the overall thickness of the electrode assembly 10 increases as much as the thickness of the negative electrode active material coated on the negative electrode coated portion 13c. This also applies to the positive electrode 12. That is, the positive electrode 12 includes a positive electrode starting portion 12a uncoated with a positive electrode active material and having the positive electrode tab 15 connected to an upper end thereof. Also, the positive electrode 12 includes a positive electrode coated portion 12c made of a current collector extending from the positive electrode starting portion 12a and having at least one plane coated with a positive electrode active material 12b. Since the positive electrode coated portion 12c also starts at a portion overlapping with (aligned with) the positive electrode tab 15, the thickness of the electrode assembly 10 increases.

In other words, the negative electrode coated portion 13c starts at a portion that is aligned with the positive electrode tab 15, and thus the overall thickness of the electrode assembly 10 is necessarily increased by as much as the thickness of the negative electrode active material coated on the negative electrode coated portion 13c. As shown in FIG. 2, the negative electrode coated portion 13c starts at a place that is aligned with the positive electrode tab 15. To restate this in a slightly different manner, the negative electrode coated portion 13c starts at a place that is below the positive electrode tab 15, as depicted in the orientation shown in FIG. 2.

As shown in FIG. 2, the positive electrode coated portion 12c extends from the positive electrode starting portion 12a. That is, the positive electrode coated portion 12c starts from the positive electrode starting portion 12a at the central portion or interior of the electrode assembly 10. The positive electrode coated portion 12c terminates at or near the outer edge of the electrode assembly 10. That is, the positive electrode coated portion 12c terminates at or near the exterior of the electrode assembly 10.

As shown in FIG. 2, at least one portion of the positive electrode active material 12b terminates at region D' which is at or close to the outer part of the electrode assembly 10. The region D' is the place where at least some of the positive electrode active material 12b terminates. The region D' can also be described as the place where the positive electrode coated portion 12c terminates, because the current collector for the positive electrode ceases to be coated by the positive electrode active material 12b at region D'.

As shown in FIG. 2, at an exterior portion where winding of the electrode assembly 10 terminates, the ending portion of the positive electrode active material 12b resides at a region D'. Because the region D' overlaps with the negative electrode tab 16, the thickness of the electrode assembly 10 increases. Thus, in the same manner as described above, the thickness of the electrode assembly 10 increases.

As shown in FIG. 2, at least one portion of the negative electrode active material 13b terminates at region E' which is at or close to the outer part of the electrode assembly 10. The region E' is the place where at least some of the negative electrode active material 13b terminates. The region E' can also be described as the place where the negative electrode coated portion 13c terminates, because the current collector for the negative electrode ceases to be coated by the negative electrode active material 13b at region E'.

As shown in FIG. 2, at an exterior portion where winding of the electrode assembly 10 terminates, the ending portion of the negative electrode active material 13b resides at a region E'. Because the region E' overlaps with the negative electrode tab 16, the thickness of the electrode assembly 10 increases. Thus, in the same manner as described above, the thickness of the electrode assembly 10 increases.

The FIG. 2 shows a region F' at the position where a positive electrode coated portion 12c terminates. As shown in FIG. 2, the region F' is aligned with the negative electrode tab 16, and is directly above the negative electrode tab 16. When the position where a positive electrode coated portion 12c terminates is aligned with the negative electrode tab 16, the thickness of the electrode assembly 10 increases.

The FIG. 2 shows a region G' at the position where a positive electrode coated portion 12c starts. As shown in FIG. 2, the region G' is aligned with the positive electrode tab 15, and is directly below the positive electrode tab 15. When the position where a positive electrode coated portion 12c starts is aligned with the positive electrode tab 15, the thickness of the electrode assembly 10 increases.

The FIG. 2 shows a region H' at the position where a negative electrode coated portion 13c starts. As shown in FIG. 2, the region H' is aligned with the positive electrode tab 15, and is directly below the positive electrode tab 15. When the position where a negative electrode coated portion 13c starts is aligned with the positive electrode tab 15, the thickness of the electrode assembly 10 increases.

In this case, since the cell employing the above-described electrode assembly 10 creates no space in thickness, when it swells or there is swelling deviation after repeated charge and discharge cycling, the cell may be distorted, resulting in degradation in cell performance. Also, lithium precipitating at edges of coated portions after repeated charge and discharge cycling may increase the thickness of the cell or may distort the cell.

Figure 3A:
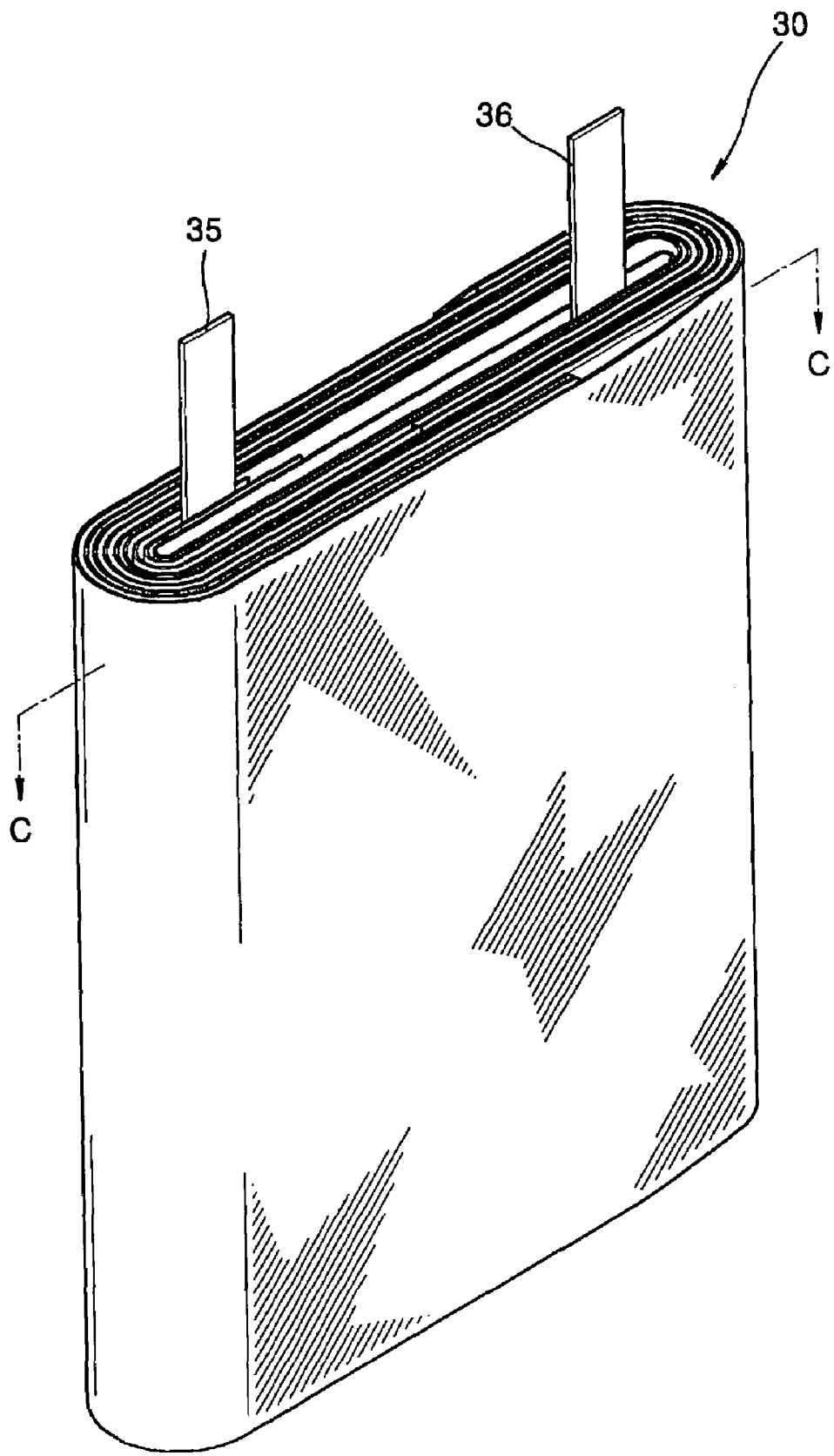
FIG. 3A is a perspective view of an electrode assembly of a lithium ion cell, in accordance with the principles of the present invention.
Figure 3B:
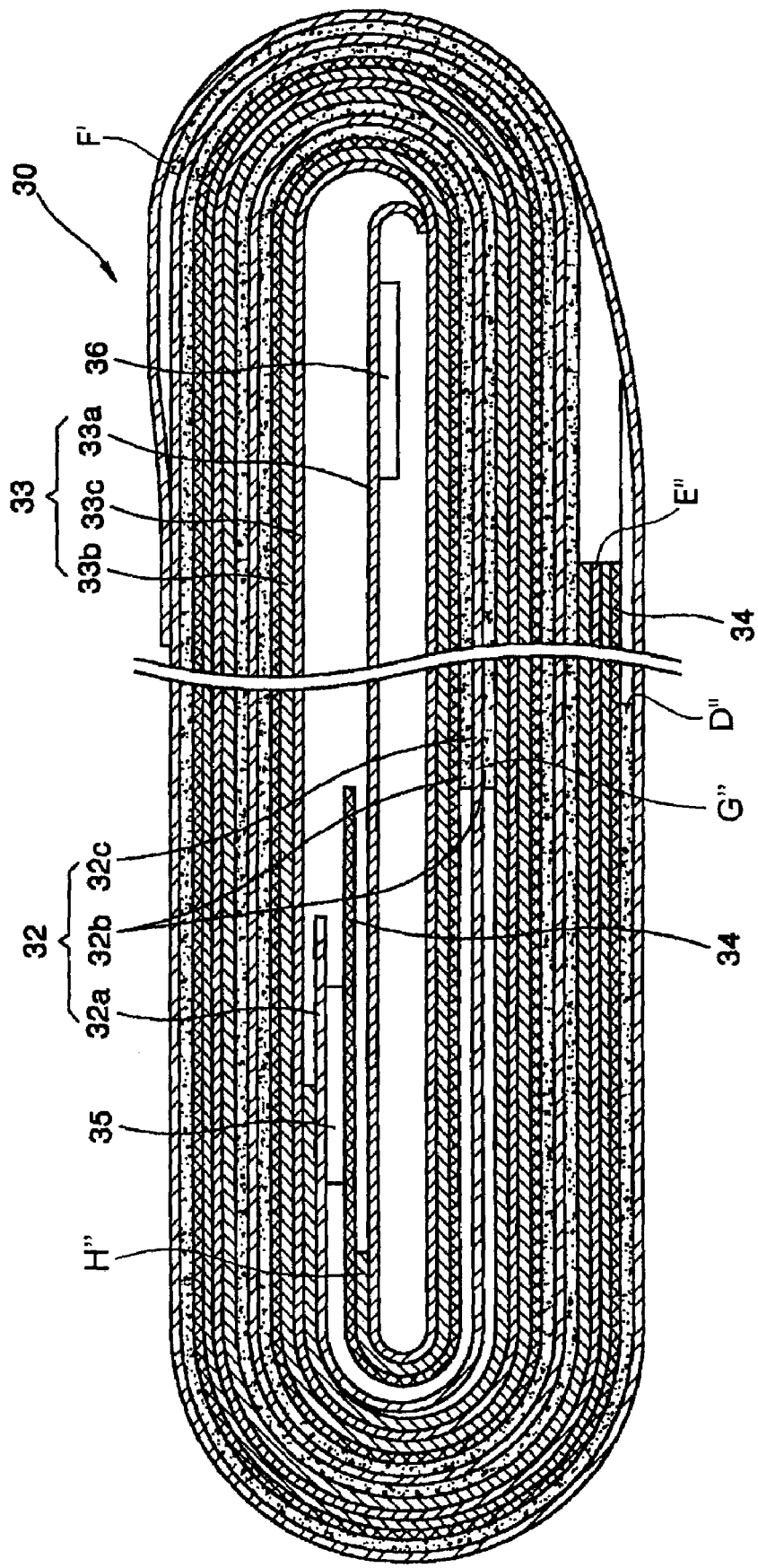
FIG. 3B is a cross-sectional view of the electrode assembly shown in FIG. 3A, taken along the line C-C, in accordance with the principles of the present invention.

A best mode of carrying out the invention will now be described in detail with reference to the accompanying drawings. FIG. 3A is a perspective view of an electrode assembly of a lithium ion cell, in accordance with the principles of the present invention. FIG. 3B is a cross-sectional view of the electrode assembly shown in FIG. 3A, taken along the line C-C, in accordance with the principles of the present invention.

Referring to FIGS. 3A and 3B, an electrode assembly 30 includes a negative electrode 33, a separator 34 and a positive electrode 32 stacked and wound. A negative electrode tab 36 and a positive electrode tab 35 extend out from the negative electrode 33 and the positive electrode 32, respectively.

The negative electrode 33 is formed by winding a first stacked structure having a negative electrode starting portion 33a made of a first current collector from which the negative electrode tab 36 extends at an upper end of the negative electrode 33, and a negative electrode coated portion 33c extending from the negative electrode starting portion 33a and having a negative electrode active material 33b coated on at least one plane of the current collector.

The positive electrode 32 is formed by winding a second stacked structure having a positive electrode starting portion 32a made of a second current collector from which the positive electrode tab 35, spaced a predetermined distance apart from the negative electrode tab 36, extends at an upper end of the positive electrode 32, and a positive electrode coated portion 32c extending from the positive electrode starting portion 32a and having a positive electrode active material 32b coated on at least one plane of the current collector, the positive electrode coated portion 32c being spaced a predetermined distance apart from the negative electrode 33. The separator 34 interposed between the positive and negative electrodes 32 and 33 provides electrical insulation.

The negative electrode coated portion 33c starts at a portion that is not aligned with the positive electrode tab 35, and thus the overall thickness of the electrode assembly 30 is necessarily decreased by as much as the thickness of the negative electrode active material coated on the negative electrode coated portion 33c. As shown in FIG. 3B, the negative electrode coated portion 33c starts at a place that is not aligned with the positive electrode tab 35. To restate this in a slightly different manner, the negative electrode coated portion 33c starts at a place that is not below the positive electrode tab 35, and is not above the positive electrode tab 35, as depicted in the orientation shown in FIG. 3B.

The first and second current collectors can include the same materials. As shown in FIG. 3B, the positive electrode coated portion 32c extends from the positive electrode starting portion 32a. That is, the positive electrode coated portion 32c starts from the positive electrode starting portion 32a at the central portion or interior of the electrode assembly 30. The positive electrode coated portion 32c terminates at or near the outer edge of the electrode assembly 30. That is, the positive electrode coated portion 32c terminates at or near the exterior of the electrode assembly 30. As shown in FIG. 3B, at least one portion of the positive electrode active material 32b terminates at region D" which is at or close to the outer part of the electrode assembly 30. The region D" is the place where at least some of the positive electrode active material 32b terminates. The region D" can also be described as the place where the positive electrode coated portion 32c terminates, because the current collector for the positive electrode ceases to be coated by the positive electrode active material 32b at region D".

The positive electrode coated portion 32c starts at a portion where it does not overlap with the positive electrode tab 35. In other words, the positive electrode coated portion 32c starts at a portion that does not correspond to the positive electrode tab 35. Thus, the thickness of the portion where the positive electrode tab 35 is disposed is reduced, allowing the entire thickness of the cell to be reduced. The case of the negative electrode tab 36 is the same. That is, the starting portion of the positive electrode coated portion 32c does not overlap with the negative electrode tab 36, thereby reducing the entire thickness of the cell.

Also, in the case where the negative electrode coated portion 33c starts at a portion where it does not overlap with the positive electrode tab 35, a space is created at a portion from which the positive electrode tab 32 extends, compared to the case where the negative electrode coated portion 33c starts at a portion where it overlaps with the positive electrode tab 35. In such a manner, shifting the starting portions of the positive and negative electrode coated portions 32c and 33c to portions where the positive and negative electrode tabs are not disposed, creates a space having a width of approximately 0.2 millimeters (mm).

As shown in FIG. 3B, at an exterior portion of the cell, the negative electrode active material 33b terminates at a region E" where it does not overlap with the negative electrode tab 36. Because the region E" shown in FIG. 3B does not overlap with the negative electrode tab 36, the electrode assembly 30, in accordance with the principles of the present invention, can have a smaller width. In other words, because of the position of region E", there is no additional increase in thickness of the portion of the electrode assembly 30 corresponding to the negative electrode tab 36, As shown in FIG. 3B, at an exterior portion of the cell, the positive electrode active material 32b terminates at a region D" where it does not overlap with the negative electrode tab 36. Because the region D" shown in FIG. 3B does not overlap with the negative electrode tab 36, the electrode assembly 30, in accordance with the principles of the present invention, can have a smaller width. In other words, because of the position of region D", there is no additional increase in thickness of the portion of the electrode assembly 30 corresponding to the negative electrode tab 36.

The negative electrode coated portion 33c terminates at region E". A positive electrode coated portion 32c terminates at region D", or, in other words, ceases to be coated at region D". In view of the advantageous positions of regions D" and E" as shown in FIG. 3B, there is an increased space having a width of approximately 0.15 millimeters (mm).

The FIG. 3B shows a region F" at the position where a positive electrode coated portion 32c terminates. As shown in FIG. 3B, the region F" is not aligned with the negative electrode tab 36. That is, the region F" is not directly above the negative electrode tab 36. When the position where a positive electrode coated portion 32c terminates is not aligned with the negative electrode tab 36, the thickness of the electrode assembly 30 can be decreased. Thus, the assembly shown in FIG. 3B can be thinner than the assembly shown in FIG. 2.

The FIG. 3B shows a region G" at the position where a positive electrode coated portion 32c starts. As shown in FIG. 3B, the region G" is not aligned with the positive electrode tab 35. That is, the region G" is not directly below the positive electrode tab 15. When the position where a positive electrode coated portion 32c starts is not aligned with the positive electrode tab 35, the thickness of the electrode assembly 30 can be decreased. Thus, the assembly shown in FIG. 3B can be thinner than the assembly shown in FIG. 2.

The FIG. 3B shows a region H" at the position where a negative electrode coated portion 33c starts. As shown in FIG. 3B, the region H" is not aligned with the positive electrode tab 35. That is, the region H" is not directly below the positive electrode tab 35. When the position where a negative electrode coated portion 33c starts is not aligned with the positive electrode tab 35, the thickness of the electrode assembly 30 can be decreased. Thus, the assembly shown in FIG. 3B can be thinner than the assembly shown in FIG. 2.

As described above, the starting positions of the negative electrode coated portion 33c and/or the positive electrode coated portion 32c, or the ending position thereof, are made not to overlap with the positive electrode tab 35 or the negative electrode tab 36, thereby increasing a space whose width is approximately 100 micrometers (μm) or more, which is a thickness range enough to be well adapted with a change in thickness of a cell after repeated charge and discharge cycling cycles. Therefore, a high capacity cell that is not distorted due to a change in thickness of the cell can be realized.

Figure 4:
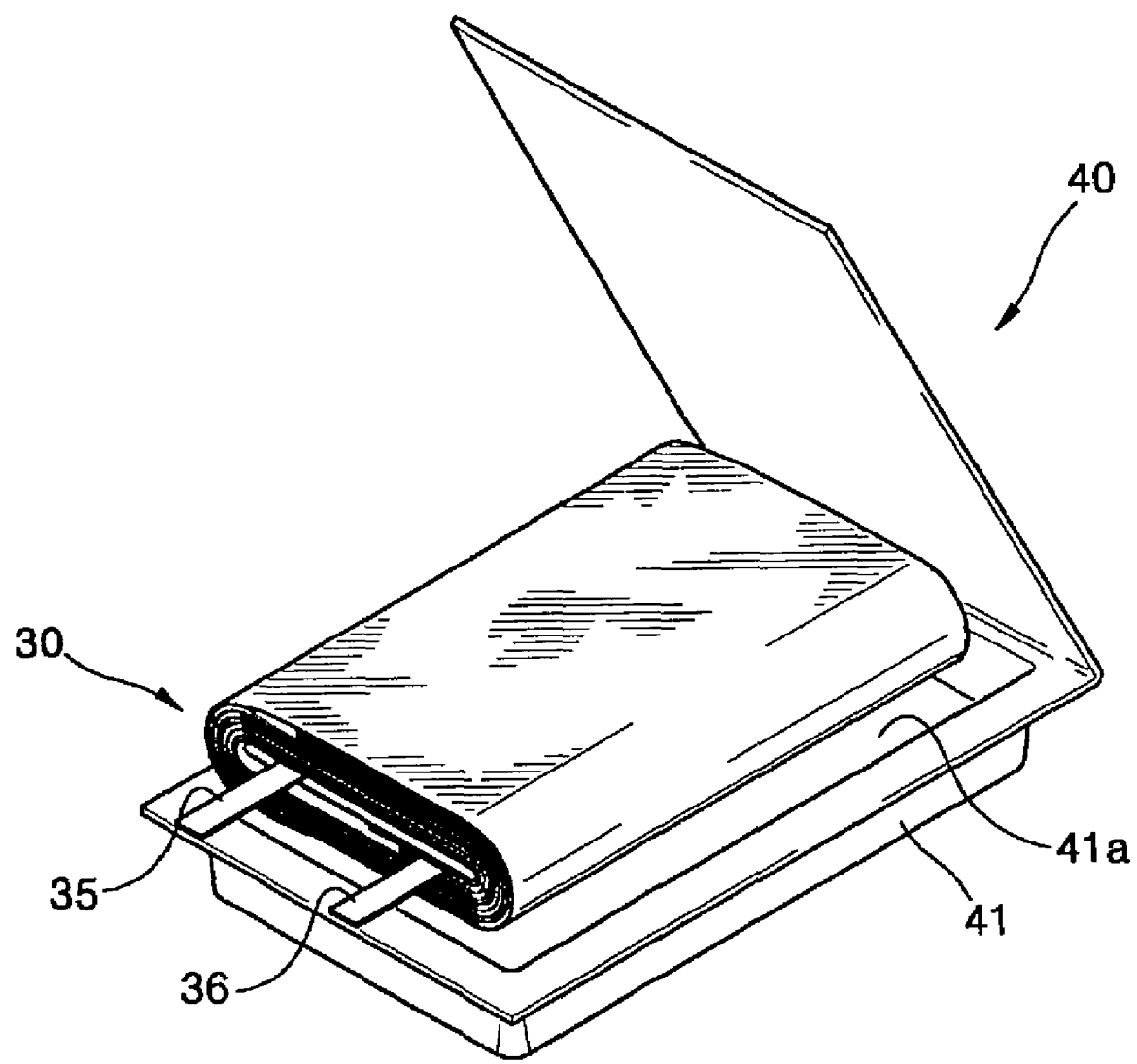
FIG. 4 is a perspective view of a lithium ion cell, in accordance with the principles of the present invention.

FIG. 4 is a perspective view of a lithium ion cell, in accordance with the principles of the present invention. Referring to FIG. 4, a lithium ion cell 40 is constructed such that an electrode assembly 30 is encased in an internal space 41a of a pouch 41, and the internal space 41a is impregnated with an electrolytic solution.

As shown in FIG. 4, the electrode assembly 30 is housed in the pouch 41. Otherwise, the electrode assembly 30 may be encased in a can. In this case, the upper portion of the can is covered by a cap plate assembly which seals the upper portion of the can and provides an electrical connection between the electrode assembly 30 and the outside of the can. Encasing, sealing, impregnation of an electrolytic solution and the like can be performed by ordinary manners.

Figure 5:
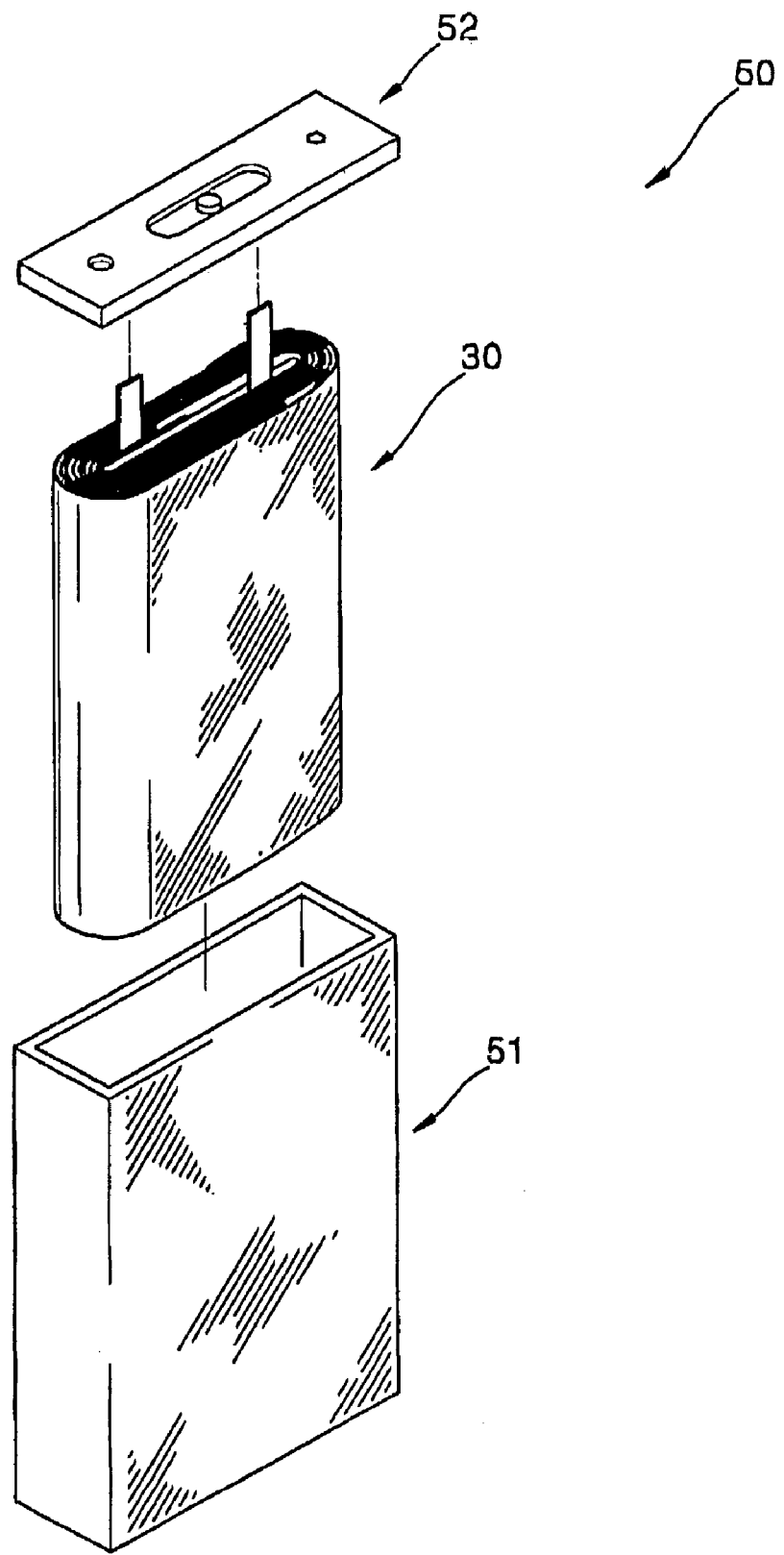
FIG. 5 is a perspective view of an electrode assembly, lithium ion cell, can, and cap assembly, in accordance with the principles of the present invention.

FIG. 5 is a perspective view of an electrode assembly, lithium ion cell, can, and cap assembly, in accordance with the principles of the present invention. The FIG. 5 shows an electrode assembly 30, lithium ion cell 50, can 51, and cap plate assembly 52.

As described above, the electrode assembly for a lithium ion cell and a lithium ion cell using the electrode assembly, according to the principles of the present invention, can provide a space having a width that is large enough to deal well with an increase in thickness of the cell after repeated charge and discharge cycling, thereby preventing an increase in thickness or distortion in shape of the cell, which may occur after repeated cycling. Therefore, a highly reliable lithium ion cell can be attained.

While this invention has been particularly shown and described with reference to preferred embodiments thereof, it will be understood by those skilled in the art that various changes in form and details may be made therein without departing from the spirit and scope of the invention as defined by the appended claims. That is, while the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures maybe made from such details without departing from the spirit and scope of the applicant's general inventive concept.

What is claimed is:

1. An electrode assembly, comprising:
a negative electrode including a negative electrode starting portion, a negative electrode coated portion, and negative electrode active material, the negative electrode starting portion having a negative electrode tab, the negative electrode coated portion starting from and extending from the negative electrode starting portion, both sides of the negative electrode starting portion being not coated with the negative electrode active material, at least one plane of the negative electrode coated portion being coated with the negative electrode active material;
a positive electrode including a positive electrode starting portion, a positive electrode coated portion, and positive electrode active material, the positive electrode starting portion having a positive electrode tab, the positive electrode coated portion starting from and extending from the positive electrode starting portion, both sides of the positive electrode starting portion being not coated with the positive electrode active material, at least one plane of the positive electrode coated portion being coated with the positive electrode active material, the positive electrode tab being spaced a predetermined distance apart from the negative electrode tab;
a separator being disposed between said positive and negative electrodes and providing electrical insulation, a stack of the negative electrode, the separator, and the positive electrode being formed into a wound structure by winding the stack of the negative electrode, the separator, and the positive electrode around both of the negative electrode tab and the positive electrode tab, the negative electrode coated portion starting at a portion not aligned with a portion where the positive electrode coated portion starts and starting at a portion not aligned with a portion where the positive electrode coated portion terminates; and
an electrolytic solution impregnating the wound structure.

2. The electrode assembly of claim 1, with the negative electrode coated portion starting at a portion not aligned with at least one selected from among the positive electrode tab and the negative electrode tab.

3. The electrode assembly of claim 2, with the positive electrode coated portion terminating at a portion not aligned with at least one selected from among the positive electrode tab and the negative electrode tab.

4. The electrode assembly of claim 3, with the negative electrode coated portion terminating at a portion not aligned with at least one selected from among the positive electrode tab and the negative electrode tab.

5. The electrode assembly of claim 1, with the positive electrode coated portion terminating at a portion not aligned with at least one selected from among the positive electrode tab and the negative electrode tab.

6. The electrode assembly of claim 5, with the negative electrode coated portion terminating at a portion not aligned with at least one selected from among the positive electrode tab and the negative electrode tab.

7. The electrode assembly of claim 1, with the negative electrode tab not aligned with a starting portion of the negative electrode coated portion, a terminating portion of the negative electrode coated portion, a starting portion of the positive electrode coated portion, and a terminating portion of the positive electrode coated portion.

8. The electrode assembly of claim 7, with the positive electrode tab not aligned with a starting portion of the negative electrode coated portion, a terminating portion of the negative electrode coated portion, a starting portion of the positive electrode coated portion, and a terminating portion of the positive electrode coated portion.

9. A lithium ion cell, comprising:
an electrode assembly, comprising:
a negative electrode including a negative electrode starting portion, a negative electrode coated portion, and negative electrode active material, the negative electrode starting portion having a negative electrode tab, the negative electrode coated portion starting from and extending from the negative electrode starting portion, both sides of the negative electrode starting portion being not coated with the negative electrode active material, at least one plane of the negative electrode coated portion being coated with the negative electrode active material;
a positive electrode including a positive electrode starting portion, a positive electrode coated portion, and positive electrode active material, the positive electrode starting portion having a positive electrode tab, the positive electrode coated portion starting from and extending from the positive electrode starting portion, both sides of the positive electrode starting portion being not coated with the positive electrode active material, at least one plane of the positive electrode coated portion being coated with the positive electrode active material, the positive electrode tab being spaced a predetermined distance apart from the negative electrode tab; and
a separator being disposed between said positive and negative electrodes and providing electrical insulation, a stack of the negative electrode, the separator, and the positive electrode being formed into a wound structure by winding the stack of the negative electrode, the separator, and the positive electrode around both of the negative electrode tab and the positive electrode tab, the negative electrode coated portion starting at a portion not aligned with a portion where the positive electrode coated portion starts and starting at a portion not aligned with a portion where the positive electrode coated portion terminates;

a case encasing said electrode assembly; and an electrolytic solution being in said case.

10. The lithium ion cell of claim 9, with said case corresponding to a pouch.

11. The lithium ion cell of claim 9, said case further comprising:

a cap plate assembly sealing said case and providing an electrical connection between an interior of said electrode assembly and an exterior of said electrode assembly.

12. The lithium ion cell of claim 9, with the negative electrode coated portion starting at a portion not aligned with at least one selected from among the positive electrode tab and the negative electrode tab.

13. The lithium ion cell of claim 12, with the positive electrode coated portion terminating at a portion not aligned with at least one selected from among the positive electrode tab and the negative electrode tab.

14. The lithium ion cell of claim 13, with the negative electrode coated portion terminating at a portion not aligned with at least one selected from among the positive electrode tab and the negative electrode tab.

15. The lithium ion cell of claim 9, with the positive electrode coated portion terminating at a portion not aligned with at least one selected from among the positive electrode tab and the negative electrode tab.

16. The lithium ion cell of claim 15, with the negative electrode coated portion terminating at a portion not aligned with at least one selected from among the positive electrode tab and the negative electrode tab.

17. The electrode assembly of claim 9, with the negative electrode tab not aligned with a starting portion of the negative electrode coated portion, a terminating portion of the negative electrode coated portion, a starting portion of the positive electrode coated portion, and a terminating portion of the positive electrode coated portion. the negative electrode coated portion, a starting portion of the positive electrode coated portion, and a terminating portion of the positive electrode coated portion.

18. The electrode assembly of claim 17, with the positive electrode tab not aligned with a starting portion of the negative electrode coated portion, a terminating portion of the negative electrode coated portion, a starting portion of the positive electrode coated portion, and a terminating portion of the positive electrode coated portion.

* * * * *